(12) United States Patent
Chung et al.

(10) Patent No.: US 11,909,063 B2
(45) Date of Patent: Feb. 20, 2024

(54) BATTERY ADHESIVE STRUCTURE AND ELECTRONIC DEVICE COMPRISING SAME

(71) Applicant: Samsung Electronics Co., Ltd., Suwon-si (KR)

(72) Inventors: Soonwan Chung, Suwon-si (KR); Myungheon Kang, Suwon-si (KR); Junho Park, Suwon-si (KR); Junghyun Lee, Suwon-si (KR); Changhyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 449 days.

(21) Appl. No.: 17/250,634

(22) PCT Filed: Aug. 5, 2019

(86) PCT No.: PCT/KR2019/009718
§ 371 (c)(1),
(2) Date: Feb. 12, 2021

(87) PCT Pub. No.: WO2020/036355
PCT Pub. Date: Feb. 20, 2020

(65) Prior Publication Data
US 2021/0384583 A1 Dec. 9, 2021

(30) Foreign Application Priority Data
Aug. 14, 2018 (KR) .......................... 10-2018-0094907

(51) Int. Cl.
*H01M 50/293* (2021.01)
*H01M 50/247* (2021.01)
(Continued)

(52) U.S. Cl.
CPC ......... *H01M 50/293* (2021.01); *C09J 109/06* (2013.01); *C09J 123/22* (2013.01);
(Continued)

(58) Field of Classification Search
None
See application file for complete search history.

(56) References Cited

U.S. PATENT DOCUMENTS

| 5,677,568 A * | 10/1997 | Ochi | H01M 50/216 257/679 |
| 2003/0125602 A1 * | 7/2003 | Sokolich | H04R 25/606 600/25 |

(Continued)

FOREIGN PATENT DOCUMENTS

| JP | 2017-518404 A | 7/2017 |
| KR | 10-1052123 B1 | 7/2011 |

(Continued)

OTHER PUBLICATIONS

International Search Report and Written Opinion of the International Searching Authority in connection with International Application No. PCT/KR2019/009718 dated Nov. 20, 2019, 10 pages.

(Continued)

*Primary Examiner* — Gregg Cantelmo

(57) ABSTRACT

An electronic device, according to various embodiments of the present disclosure, may comprise: a housing including a seating groove therein; a battery seated in the seating groove, at least a partial area of which includes a curved surface; and an adhesive member disposed between the battery and the seating groove and formed along at least a portion of an edge of the battery. The adhesive member may be formed having varied predetermined thicknesses, corresponding to a position of the battery.

15 Claims, 14 Drawing Sheets

(51) Int. Cl.
  *H01M 50/202* (2021.01)
  *C09J 109/06* (2006.01)
  *C09J 123/22* (2006.01)
  *H04M 1/02* (2006.01)
  *H01M 50/264* (2021.01)
  *H01M 50/244* (2021.01)
  *H01M 50/289* (2021.01)
  *H01M 50/284* (2021.01)

(52) U.S. Cl.
  CPC ....... *H01M 50/202* (2021.01); *H01M 50/244* (2021.01); *H01M 50/247* (2021.01); *H01M 50/264* (2021.01); *H04M 1/0262* (2013.01); *H01M 50/284* (2021.01); *H01M 50/289* (2021.01); *H01M 2220/30* (2013.01)

(56) References Cited

U.S. PATENT DOCUMENTS

| 2004/0253867 | A1* | 12/2004 | Matsumoto | H01H 13/81 |
|---|---|---|---|---|
| | | | | 439/500 |
| 2005/0245983 | A1* | 11/2005 | Kast | A61N 1/37512 |
| | | | | 607/36 |
| 2010/0162558 | A1 | 7/2010 | Hiratsuka et al. | |
| 2012/0115025 | A1 | 5/2012 | Kim et al. | |
| 2013/0053110 | A1* | 2/2013 | Pope | H01M 50/209 |
| | | | | 429/100 |
| 2014/0356672 | A1* | 12/2014 | Lee | H01M 10/425 |
| | | | | 429/186 |
| 2016/0091932 | A1 | 3/2016 | Dighde et al. | |
| 2016/0091933 | A1 | 3/2016 | Rockford et al. | |
| 2016/0093846 | A1* | 3/2016 | Malinski | H01M 50/211 |
| | | | | 429/100 |
| 2019/0326567 | A1 | 10/2019 | Hur et al. | |

FOREIGN PATENT DOCUMENTS

| KR | 10-2016-0121927 A | 10/2016 |
|---|---|---|
| KR | 10-2017-0062515 A | 6/2017 |
| KR | 10-2018-0074467 A | 7/2018 |
| WO | 2020213988 A1 | 10/2020 |

OTHER PUBLICATIONS

Supplementary European Search Report dated Jul. 23, 2021 in connection with European Application No. 19850194.2, 6 pages.
Office Action dated Nov. 9, 2022 in connection with India Patent Application No. 202137005833, 5 pages.
Request for the Submission of an Opinion dated Dec. 12, 2022 in connection with Korean Patent Application No. 10-2018-0094907, 15 pages.

* cited by examiner

BATTERY ADHESIVE STRUCTURE AND ELECTRONIC DEVICE COMPRISING SAME

CROSS-REFERENCE TO RELATED APPLICATIONS

This application is a National Phase Entry of PCT international Application No. PCT/KR2019/009718, which was filed on Aug. 5, 2019, and claims priority to Korean Patent Application No. 10-2018-0094907 filed on Aug. 14, 2018, in the Korean Intellectual Property Office, the contents of which are incorporated herein by reference.

BACKGROUND

1. Field

Various embodiments of the present invention relate to a battery adhesive structure and an electronic device including the same, and for example, to an adhesive structure of a battery disposed in an electronic device.

2. Description of Related Art

The term "electronic device" may mean a device performing a particular function according to its equipped program, such as a home appliance, an electronic scheduler, a portable multimedia player, a mobile communication terminal, a tablet PC, a video/sound device, a desktop PC or laptop computer, a navigation for automobile, etc. For example, electronic devices may output stored information as voices or images. As electronic devices are highly integrated, and high-speed, high-volume wireless communication becomes commonplace, an electronic device, such as a mobile communication terminal, is recently being equipped with various functions.

An electronic device has a rechargeable battery which is a secondary battery, such as a nickel-cadmium battery, polymer battery, or lithium ion battery. By their memory effect-free and high-capacity properties, lithium ion batteries are useful for portable devices. For example, lithium ion batteries are manufactured by coating a rectangular base with a battery active material in a predetermined area and shape and attaching electrode tabs on the uncoated surface.

Since the battery is a component closely related to consumer safety accidents (e.g., PL accidents), care needs to be taken in handling. At the same time, it is necessary to design and assemble a safe battery applicable to various environmental conditions in response to various consumer usage conditions. Typical battery accidents include battery heat generation, ignition, leakage, and swelling, all of which may occur under conditions of dropping impact. To reduce battery deformation due to impact, various structural improvements are required between the battery and adjacent components.

SUMMARY

In general, as a structure for fixing the battery in the electronic device, a solid adhesive member such as a tape may be used. In the case of using an adhesive member such as a tape, since the flatness of the battery mounted on the electronic device is lowered, a strong adhesive force cannot be secured on a portion subject to severe bending. Further, depending on the shape of the electronic device and the battery, the shape of the tape needs to be changed as well, and the resultant replacement of subsidiary materials may cause a manufacturing cost rise.

As another example, when a portion of the battery is formed of a curved surface (e.g., when provided in a jelly roll shape), the curved portion may be excluded from the adhesion area when it is fixed to an internal structure of the electronic device.

According to various embodiments of the present disclosure, an adhesive member for fixing a battery in an electronic device is implemented as a liquid material, so that a uniform flatness is achieved, and it is thus possible to provide a strong adhesive force and save costs.

According to various embodiments of the present disclosure, even when a portion of the battery is bent in the electronic device, the adhesion surface may be enlarged by implementing the adhesive member corresponding to the curved shape.

According to various embodiments of the disclosure, an electronic device comprises a housing including a seating groove, a battery seated in the seating groove and including at least a portion in a curved shape, and an adhesive member disposed between the battery and the seating groove and formed along at least a portion of an edge of the battery. The adhesive member may be formed to have a different designated thickness corresponding to a position of the battery.

According to various embodiments of the disclosure, an electronic device comprises a housing including a seating groove, an electronic component seated in the seating groove, and a plurality of adhesive members disposed between the electronic component and the seating groove and arranged along at least a portion of an edge of the electronic component including a curved shape. Each of the plurality of adhesive members may be formed of a different material.

According to various embodiments of the disclosure, an electronic device comprises a housing including a seating groove, an electronic component seated in the seating groove, and a plurality of adhesive members disposed between the electronic component and the seating groove and arranged along at least a portion of an edge of the electronic component including a curved shape. A first portion of each of the plurality of adhesive members may form the same thickness, and a second portion thereof extending from the first portion may have a variable thickness toward an outside.

In an electronic device according to various embodiments of the present disclosure, an adhesive member for fixing a battery to a housing maintains a uniform flatness on one surface in contact with the housing, thereby improving adhesive performance.

In the electronic device according to various embodiments of the present disclosure, even when a portion of the battery is bent in the electronic device, the adhesion surface may be enlarged by implementing the adhesive member corresponding to the curved shape.

The electronic device according to various embodiments of the present disclosure may maintain strong adhesion between the battery and the electronic device under various environmental conditions by disposing a plurality of adhesive members of different materials on the battery.

DETAILED DESCRIPTION

Figure 1:
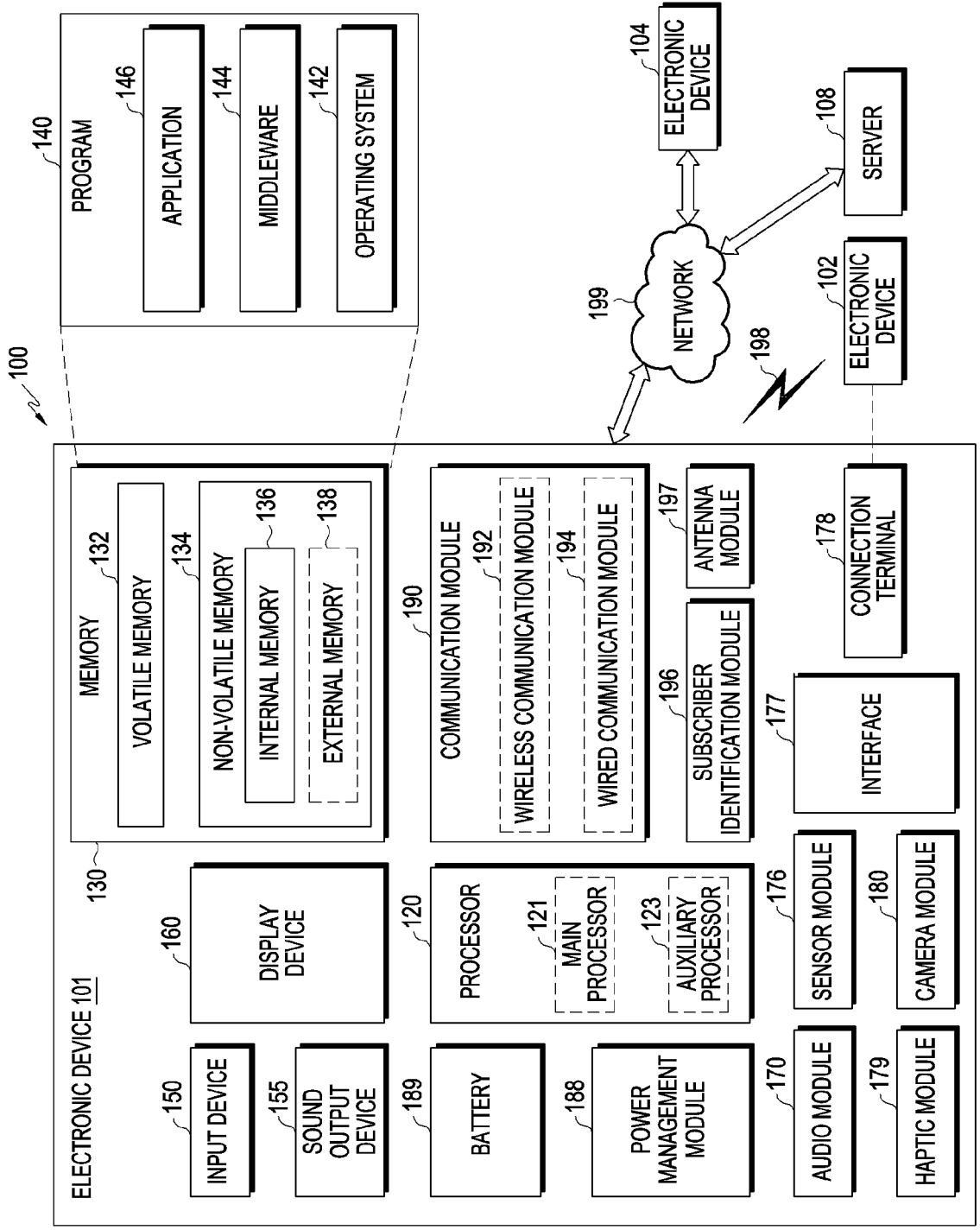
FIG. 1 is a block diagram illustrating an electronic device in a network environment according to various embodiments of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
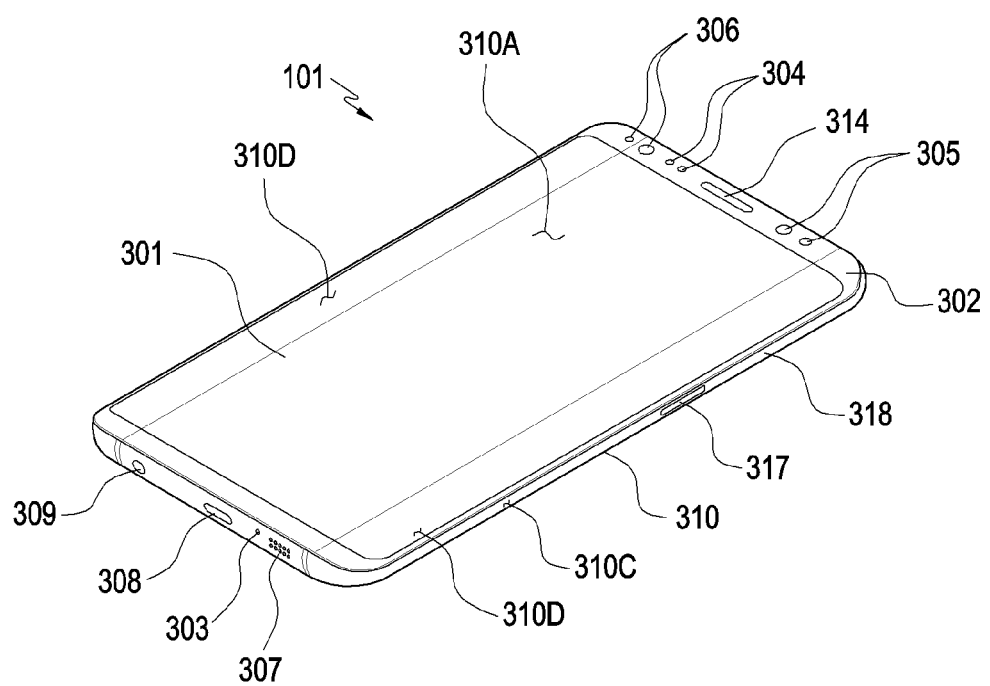
FIG. 2 is a front perspective view illustrating an electronic device according to various embodiments of the disclosure.
Figure 3:
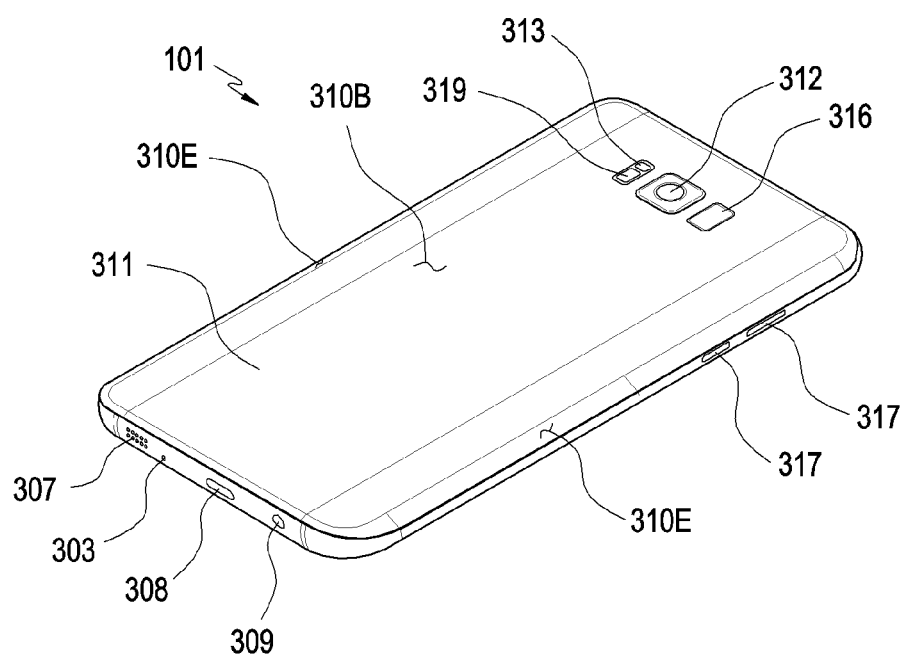
FIG. 3 is a rear perspective view illustrating an electronic device according to various embodiments of the disclosure.

FIG. 2 is a front perspective view illustrating an electronic device 101 according to an embodiment. FIG. 3 is a rear perspective view illustrating an electronic device 101 according to an embodiment.

Referring to FIGS. 2 and 3, according to an embodiment, an electronic device 101 may include a housing 310 with a first (or front) surface 310A, a second (or rear) surface 310B, and a side surface 310C surrounding a space between the first surface 310A and the second surface 310B. According to another embodiment (not shown), the housing may denote a structure forming part of the first surface 310A, the second surface 310B, and the side surface 310C of FIG. 2. According to an embodiment, at least part of the first surface 310A may have a substantially transparent front plate 302 (e.g., a glass plate or polymer plate including various coat layers). The second surface 310B may be formed of a substantially opaque rear plate 311. The rear plate 311 may be formed of, e.g., laminated or colored glass, ceramic, polymer, metal (e.g., aluminum, stainless steel (STS), or magnesium), or a combination of at least two thereof. The side surface 310C may be formed by a side bezel structure (or a "side member") 318 that couples to the front plate 302 and the rear plate 311 and includes a metal and/or polymer. According to an embodiment, the rear plate 311 and the side bezel plate 318 may be integrally formed together and include the same material (e.g., a metal, such as aluminum).

In the embodiment illustrated, the front plate 302 may include two first regions 310D, which seamlessly and bendingly extend from the first surface 310A to the rear plate 311, on both the long edges of the front plate 302. In the embodiment (refer to FIG. 3) illustrated, the rear plate 311 may include two second regions 310E, which seamlessly and bendingly extend from the second surface 310B to the front plate, on both the long edges. According to an embodiment, the front plate 302 (or the rear plate 311) may include only one of the first regions 310 (or the second regions 310E). Alternatively, the first regions 310D or the second regions 301E may partially be excluded. According to an embodiment, at side view of the electronic device 101, the side bezel structure 318 may have a first thickness (or width) for sides that do not have the first regions 310D or the second regions 310E and a second thickness, which is smaller than the first thickness, for sides that have the first regions 310D or the second regions 310E.

According to an embodiment, the electronic device 101 may include at least one or more of a display 301, audio modules 303, 307, and 314, sensor modules 304, 316, and 319, camera modules 305, 312, and 313, key input devices 317, a light emitting device 306, and connector holes 308 and 309. According to an embodiment, the electronic device 101 may exclude at least one (e.g., the key input device 317 or the light emitting device 306) of the components or may add other components.

According to an embodiment, the display 301 may be exposed through, e.g., a majority portion of the front plate 302. According to an embodiment, at least a portion of the display 301 may be exposed through the front plate 302 forming the first surface 310A and the first regions 310D of the side surface 310C. According to an embodiment, the edge of the display 301 may be formed to be substantially the same in shape as an adjacent outer edge of the front plate 302. According to an embodiment (not shown), the interval between the outer edge of the display 301 and the outer edge of the front plate 302 may remain substantially even to give a larger area of exposure the display 301.

According to an embodiment (not shown), the screen display area of the display 301 may have a recess or opening in a portion thereof, and at least one or more of the audio module 314, sensor module 304, camera module 305, and light emitting device 306 may be aligned with the recess or opening. According to an embodiment (not shown), at least one or more of the audio module 314, sensor module 304, camera module 305, fingerprint sensor 316, and light emitting device 306 may be included on the rear surface of the screen display area of the display 301. According to an embodiment (not shown), the display 301 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor modules 304 and 519 and/or at least part of the key input device 317 may be disposed in the first regions 310D and/or the second regions 310E.

According to an embodiment, the audio modules 303, 307, and 314 may include a microphone hole 303 and speaker holes 307 and 314. The microphone hole 303 may have a microphone inside to obtain external sounds. According to an embodiment, there may be a plurality of microphones to be able to detect the direction of a sound. The speaker holes 307 and 314 may include an external speaker hole 307 and a phone receiver hole 314. According to an embodiment, the speaker holes 307 and 314 and the microphone hole 303 may be implemented as a single hole, or speakers may be rested without the speaker holes 307 and 314 (e.g., piezo speakers).

According to an embodiment, the sensor modules 304, 316, and 319 may generate an electrical signal or data value corresponding to an internal operating state or external environmental state of the electronic device 101. The sensor modules 304, 316, and 319 may include a first sensor module 304 (e.g., a proximity sensor) and/or a second sensor module (not shown) (e.g., a fingerprint sensor) disposed on the first surface 310A of the housing 310 and/or a third sensor module 319 (e.g., a heart-rate monitor (HRM) sensor) and/or a fourth sensor module 316 (e.g., a fingerprint sensor) disposed on the second surface 310B of the housing 310. The fingerprint sensor may be disposed on the second surface 310B as well as on the first surface 310A (e.g., the display 301) of the housing 310. The electronic device 101 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor 304.

According to an embodiment, the camera modules 305, 312, and 313 may include a first camera device 305 disposed on the first surface 310A of the electronic device 101, and a second camera device 312 and/or a flash 313 disposed on the second surface 310B. The camera modules 305 and 312 may include one or more lenses, an image sensor, and/or an image signal processor. The flash 313 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 101.

According to an embodiment, the key input device 317 may be disposed on the side surface 310C of the housing 310. According to an embodiment, the electronic device 101 may exclude all or some of the above-mentioned key input devices 317 and the excluded key input devices 317 may be implemented in other forms, e.g., as soft keys, on the display 301. According to an embodiment, the key input device may include the sensor module 316 disposed on the second surface 310B of the housing 310.

According to an embodiment, the light emitting device 306 may be disposed on, e.g., the first surface 310A of the housing 310. The light emitting device 306 may provide, e.g., information about the state of the electronic device 101 in the form of light. According to an embodiment, the light emitting device 306 may provide a light source that interacts with, e.g., the camera module 305. The light emitting device 306 may include, e.g., an light emitting device (LED), an infrared (IR) LED, or a xenon lamp.

The connector holes 308 and 309 may include a first connector hole 308 for receiving a connector (e.g., a universal serial bus (USB) connector) for transmitting or receiving power and/or data to/from an external electronic device and/or a second connector hole 309 (e.g., an earphone jack) for receiving a connector for transmitting or receiving audio signals to/from the external electronic device.

Figure 4:
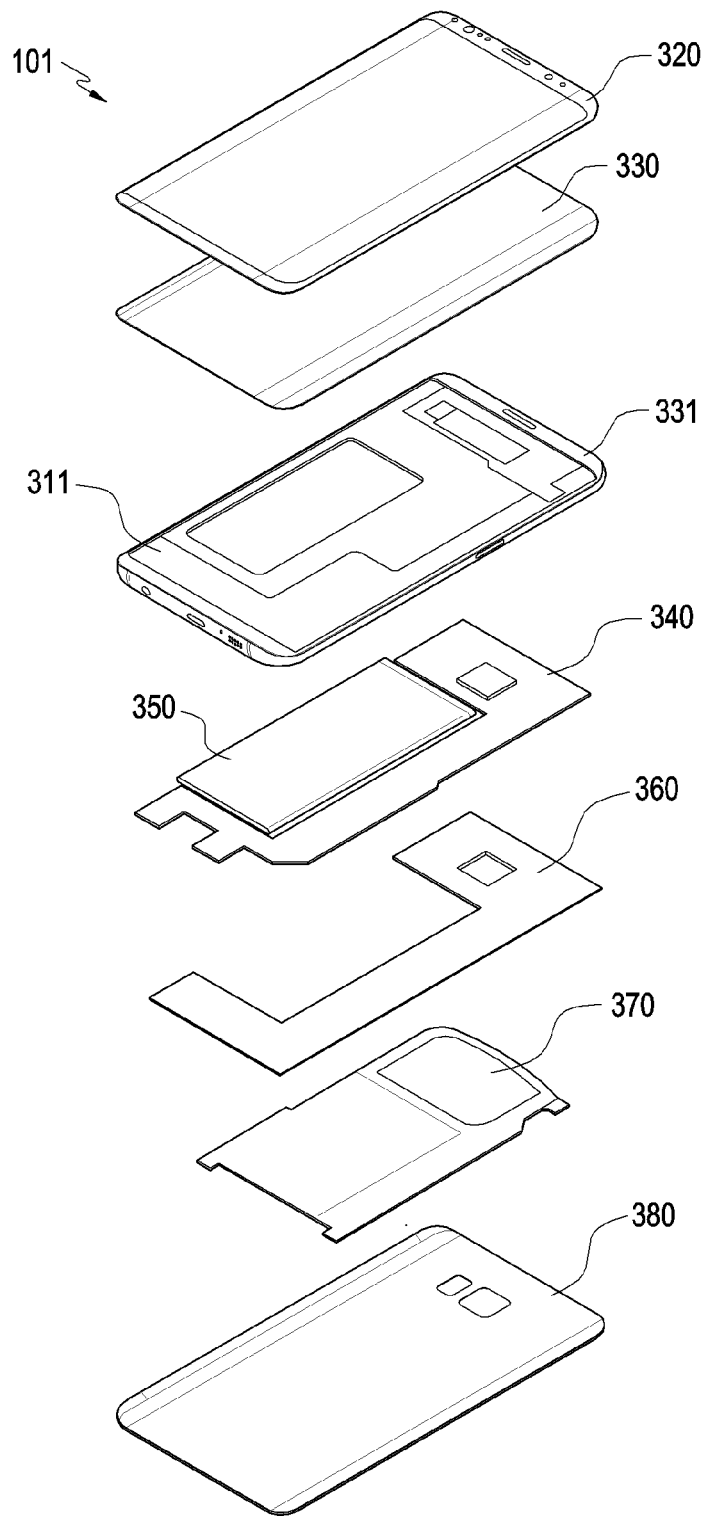
FIG. 4 is an exploded perspective view illustrating an electronic device according to various embodiments of the disclosure.

FIG. 4 is an exploded perspective view illustrating an electronic device 101 according to various embodiments.

Referring to FIG. 4, an electronic device 101 (e.g., the electronic device 101 of FIGS. 1 to 4) may include a side bezel structure 331, a first support member 332 (e.g., a bracket), a front plate 320, a display 330, a printed circuit board (PCB) 340, a battery 350, a second support member 360 (e.g., a rear case), an antenna 370, and a rear plate 380.

According to an embodiment, the electronic device 101 may exclude at least one (e.g., the first support member 332 or the second support member 360) of the components or may add other components. At least one of the components of the electronic device 101 may be the same or similar to at least one of the components of the electronic device 101 of FIG. 4 or 5 and no duplicate description is made below.

According to an embodiment, the first support member 332 may be disposed inside the electronic device 101 to be connected with the side bezel structure 331 or integrated with the side bezel structure 331. The first support member 332 may be formed of, e.g., a metal and/or non-metallic material (e.g., polymer). The display 330 may be joined onto one surface of the first support member 332, and the printed circuit board 340 may be joined onto the opposite surface of the first support member 311. A processor, memory, and/or interface may be mounted on the printed circuit board 340. The processor may include one or more of, e.g., a central processing unit, an application processor, a graphic processing device, an image signal processing, a sensor hub processor, or a communication processor.

According to an embodiment, the memory may include, e.g., a volatile or non-volatile memory.

According to an embodiment, the interface may include, for example, a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to an embodiment, the battery 350 may be a device for supplying power to at least one component of the electronic device 101. The battery 189 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 101.

According to an embodiment, the antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. According to an embodiment, an antenna structure may be formed by a portion or combination of the side bezel structure 331 and/or the first support member 332.

Figure 5:
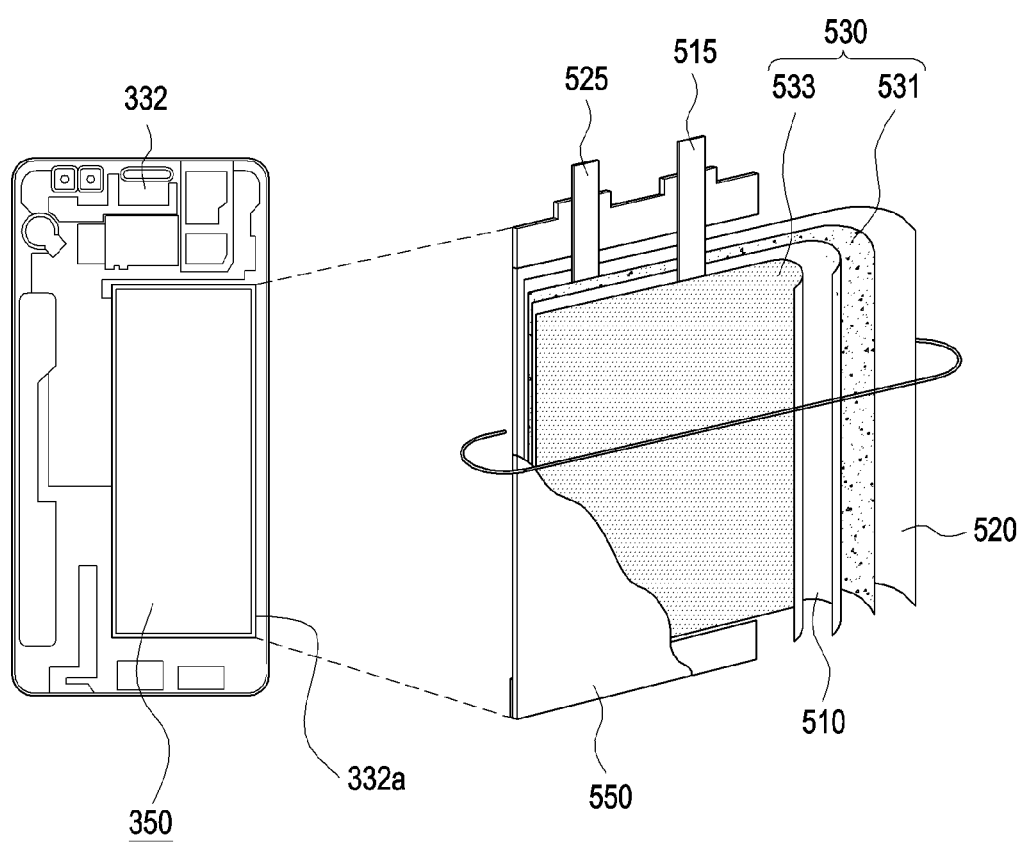
FIG. 5 is an exploded perspective view illustrating a battery mounted in an electronic device according to various embodiments of the disclosure.

FIG. 5 is an exploded perspective view illustrating a battery mounted in an electronic device according to various embodiments of the disclosure.

According to an embodiment, the battery 350 may be seated in a seating hole 332a formed in a first support member 332 (e.g., a bracket) of an electronic device (e.g., the electronic device 101 of FIGS. 1 to 4). The battery 350 may include the negative electrode sheet 510, a positive electrode sheet 520, and at least one partitioning film 530 as an electrode assembly. As another example, the battery 350 may include a pouch 550 to receive the electrode assembly.

According to an embodiment, the battery 350 may have a wrapped structure. The battery 350 may have the negative electrode sheet 510 formed on one surface of the at least one partitioning film 530 and the positive electrode sheet 520 disposed on the opposite surface thereof. The negative electrode sheet 510, the at least one partitioning film 530, and the positive electrode sheet 520 together may be wrapped in a roll shape. For example, the electrode assembly of the battery 350 may be a flexible jelly roll-type secondary battery that may be reversibly bent. The jelly roll-type secondary battery may be produced in such a jelly roll shape that the negative electrode sheet 510, the positive electrode sheet 520, and the at least one partitioning film 530 between the negative electrode sheet 510 and the positive electrode sheet 530 are stacked one over another and wrapped.

According to an embodiment, the battery 350 may be produced in a circular or elliptical shape by wrapping the negative electrode sheet 510, the partitioning film 530, and the positive electrode sheet 520, and one surface of the battery 350 may be prepared in a flat rectangular shape corresponding to the shape of the seating hole 332a.

According to an embodiment, the negative electrode sheet 510 and the positive electrode sheet 520 of the battery 350 may be disposed to face each other in shapes corresponding to each other. A negative electrode tab 515 may be prepared which externally protrudes from one side of the negative electrode sheet 510. A positive electrode tab 525 may be prepared which externally protrudes from one side of the positive electrode sheet 520. The negative electrode tab 515 and the positive electrode tab 525 may protrude in lengths corresponding to each other and be spaced apart from each other while facing each other.

According to an embodiment, the negative electrode tab 515 prepared on the negative electrode sheet 510 may be formed on an uncoated part of the negative electrode sheet 510 which is free from a negative electrode active material. The positive electrode tab 525 prepared on the positive electrode sheet 520 may be formed on an uncoated part of the positive electrode sheet 520 which is free from a positive electrode active material.

According to an embodiment, there may be provided a plurality of partitioning films 530 which may be disposed on the innermost layer of the jelly roll-type battery 350 and between the negative electrode sheet 510 and the positive electrode sheet 520. The partitioning films 530 may support the battery 350 while simultaneously preventing a contact between the negative electrode sheet 510 and the positive electrode sheet 520.

Figure 6A:
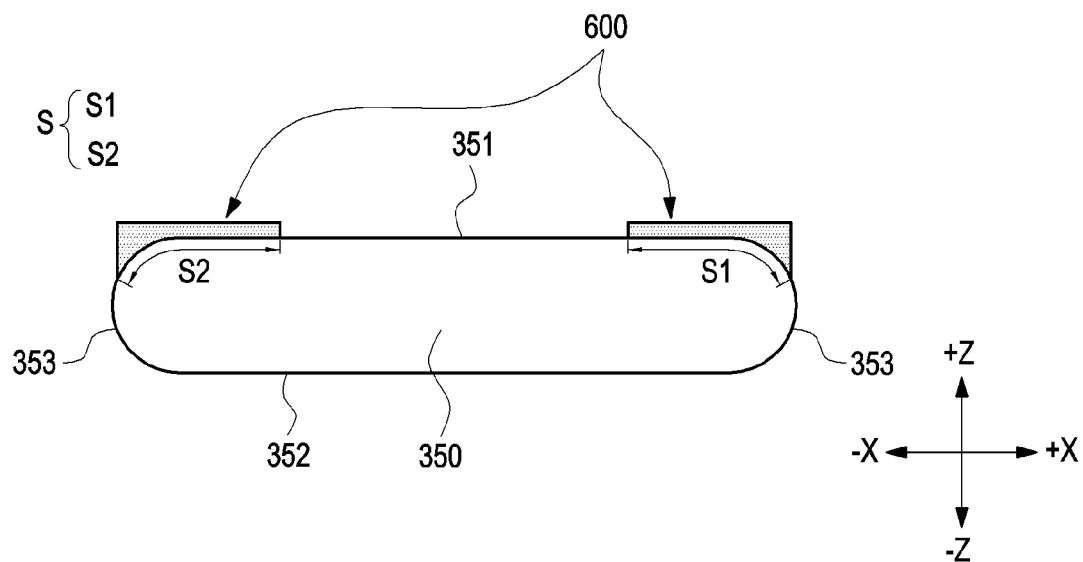
FIG. 6A is a cross-sectional view illustrating a battery and an adhesive member disposed in an area of the battery according to various embodiments of the present disclosure.
Figure 6B:
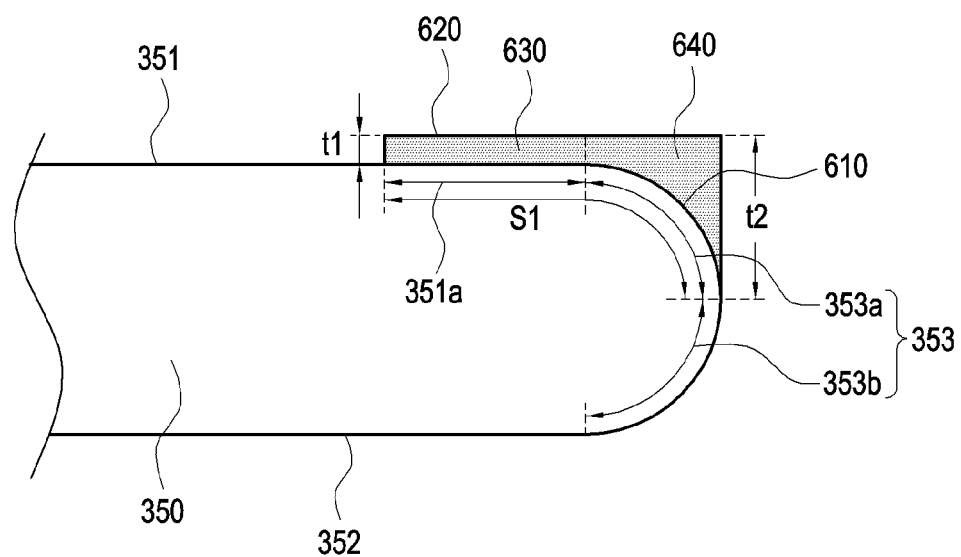
FIG. 6B is an enlarged view illustrating an enlarged area of the battery and the adhesive member of FIG. 6A.

FIG. 6A is a cross-sectional view illustrating a battery and an adhesive member disposed in an area of the battery according to various embodiments of the present disclosure. FIG. 6B is an enlarged view illustrating an enlarged area of the battery and the adhesive member of FIG. 6A.

Referring to FIGS. 6A and 6B, an electronic device (e.g., the electronic device 101 of FIGS. 1 to 4) may include a battery 350 and an adhesive member 600 for fixing the battery 350 to a seating groove (e.g., a seating groove 332a of FIG. 5). The battery 350 of FIGS. 6A and 6B may be wholly or partially identical in structure to the battery 350 of FIGS. 4 and 5.

In FIGS. 6A and 6B, the "X-axis" of the 2-axis orthogonal coordinate system may indicate the horizontal length direction (X-axis direction) of the battery 350, and the "Z-axis" may indicate the thickness direction of the battery 350. According to an embodiment of the present invention, the 'Z axis' may mean a first direction (+Z-axis direction) and a second direction (−Z-axis direction).

According to various embodiments, the battery 350, as an electrode assembly, may be a flexible jelly roll-type secondary battery that may be reversibly bent. The jelly roll-type secondary battery may be produced as a stack of a negative electrode sheet, a positive electrode sheet, and at least one partitioning film between the negative electrode sheet and the positive electrode sheet is wound in a jelly roll shape.

According to various embodiments, the battery 350 may include a first surface 351 facing in the first direction (+Z-axis direction), a second surface 352 facing in the second direction (−Z-axis direction) opposite to the first direction, and a side surface 353 extending from the first surface 351 to the second surface 352. According to an embodiment, a portion of the battery 350 may form a curved surface. For example, both end regions of the first surface 351 may be formed of side surfaces 353 corresponding to a long edge area extending seamlessly toward the second surface 352. In the above embodiments, when viewed from the side of the battery 350, both the end regions may have a semicircular shape, and may have a thickness (or width) reducing outwards. For example, the distance between the first surface 351 and the second surface 352 may have a first thickness (or width), and an area forming the side surface may have a second thickness smaller than the first thickness.

According to an embodiment, a partial area of the first surface 351 or the second surface 352 of the battery and a partial area of the side surface 353 may provide a surface on which the adhesive member 600 is disposed. For example, when the first surface 351 is disposed to face the seating groove 332a of the battery, the adhesive member 600 may be disposed in a portion extending from the partial area of the first surface 351 to the partial area of the side surface 353 is The adhesive member 600.

According to an embodiment, the adhesion area S where the adhesive member 600 is disposed may be disposed along the edge of the battery 350. For example, since a central area of the battery 350 may swell during a charging or discharging operation, the adhesive member 600 may be disposed along the edge area except for the central region. At cross-sectional view of the battery 350, the adhesion area may be divided into a first adhesion area S1 and a second adhesion area S2 spaced apart from each other. The first adhesion area S1 and the second adhesion area S2 may be provided in an area and shape corresponding to each other and may be formed of the same material or different materials.

According to various embodiments, the adhesive member 600 may include a liquid material. Since the adhesive member 600 has fluidity rather than being formed of a solidified material, the adhesive member 600 may be applied while forming different thicknesses along the curved surface of the battery 350. For example, the adhesive member 600 may include a liquid material, such as glue, which may replace a solid material such as a tape, and may include a hot melt pressure sensitive adhesive (PSA) which is capable of readhesion. When the material is melted at a high temperature (e.g., 100° C. or higher) and then discharged, the material may be cooled at room temperature and hardened, thereby exhibiting a permanent tack.

According to various embodiments, the adhesive member 600 may include one or more materials. For example, when the adhesive member 600 is formed of a plurality of materials, a material having excellent low-temperature properties, a material having excellent high-temperature properties, a material having excellent dynamic properties, and a material having excellent static properties may be selectively disposed depending on the adhesion area.

According to various embodiments, when the adhesive member 600 is disposed in the adhesion area S, a predetermined thickness may be formed from one surface of the battery 350. The adhesive member 600 may include a first adhesion surface 610 in contact with the adhesion area S of the battery 350 and a second adhesion surface 620 contacting the seating groove 332a in a direction opposite to the first adhesion surface 610. The second adhesion surface 620 may form a horizontal surface parallel to the first surface 351 of the battery 350.

Referring to FIG. 6B, the adhesion area S includes both end regions 351a of the first surface 351 of the battery 350 and a portion of the side surfaces 353 extending from both end regions 351a. For example, the side surface 353 may include a first curved surface 353a extending from the first surface 351 and a second curved surface 353b extending from the second surface 352, and the extending portion of the side surface may be the first curved surface 353a. The first curved surface 353a may be bent at an end of the first surface 351, as a starting point, and may extend up to a half of the thickness (e.g., the distance between the first surface 351 and the second surface 352) of the battery 350.

According to an embodiment, the adhesive member 600 may include a first portion 630 disposed in the end area 351a and a second portion 640 disposed on the first curved surface 353a. The first portion 630 may have the same thickness, and the second portion 640 extending from the first portion 630 may have a variable thickness towards the outside. For example, in order for the second adhesion surface 620 of the adhesive member 600 to form a horizontal surface, the adhesive member 600 (e.g., the second portion 640) formed on the first curved surface 353a may have different thicknesses depending on the position.

According to an embodiment, the second portion 640 of the adhesive member 600 includes an area whose thickness increases toward the outside. The first adhesion surface 610 of the second portion 640 may contact the battery 350, and the second adhesion surface 620 may contact the seating groove 332a. For example, the amount of the adhesive member 600 disposed adjacent to the end area 351a of the first surface 351 of the second portion 640, which is applied, may be relatively small as compared to the amount of the adhesive member 600 disposed at a distance from the end area 351a of the first surface 351. As another example, the first portion 630 of the adhesive member 600 forms a first designated thickness t1, and the thickness of the second portion 640 continuously increases over the first designated thickness t1, and an end of the second portion 640 may have a second designated thickness t2. The maximum value of the second designated thickness t2 may be the sum of half of the thickness (e.g., the distance between the first surface 351 and the second surface 352) of the battery 350 and the first designated thickness t1. However, the second portion 640 of the adhesive member 600 does not necessarily need to be applied up to the maximum value of the second designated thickness t2 and, depending on the environmental condition in which the battery is disposed, the second designated thickness t2 may be not more than the maximum value.

Figure 7:
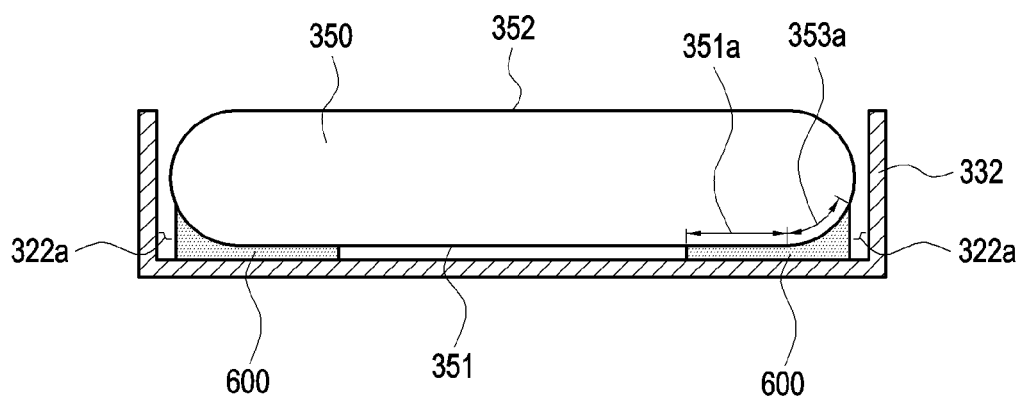
FIG. 7 is a cross-sectional view illustrating a battery disposed in an electronic device according to various embodiments of the disclosure.

FIG. 7 is a cross-sectional view illustrating a battery disposed in an electronic device according to various embodiments of the disclosure.

Referring to FIG. 7, an electronic device (e.g., the electronic device 101 of FIGS. 1 to 4) may include a battery 350 and an adhesive member 600 for fixing the battery 350 to a seating groove 332a. The battery 350 and the adhesive member 600 of FIG. 7 may be wholly or partially identical in structure to the battery 350 and the adhesive member 600 of FIGS. 6A and 6B.

According to various embodiments, the electronic device 101 may include a battery seating groove 332a formed in a first support member 332 (e.g., a bracket), and the battery 350 may be disposed in the seating groove 332a. An adhesive member 600 may be disposed between the seating groove 332a and the battery 350 to fix the battery 350. The adhesive member 600 is provided in a liquid form such as PSA rather than a solid shape such as a tape, and readhesion may be performed even when the adhesive member 600 is partially separated by an external impact or the like. Accordingly, the adhesive member 600 allows the battery 350 to remain in place in the electronic device. As another example, the adhesive member 600 is implemented as a liquid material and may adhere an area of the curved surface (e.g., side surface 353), as well as the flat area of the battery 350, to the seating groove 332a.

According to various embodiments, the battery 350 may be inserted and disposed so that the first surface 351 of the battery 350 and the seating groove 332a face each other. The adhesive member 600 may be disposed on the end area 351a of the first surface 351 and the first curved surface 353a of the side surface 353, fixing the battery 350 in the seating groove 332a. The adhesive member 600 may be formed on the entire area of the first curved surface 353a or may be formed on a partial area of the first curved surface 353a. The adhesive member 600 formed on the first curved surface 353a forms the same surface as that of the adhesive member 600 formed on the end area 351a, so that the entire area of the adhesive member 600 facing the seating groove 332a may maintain high flatness. The adhesive member 600 of the present disclosure also bonds the bent portions formed at both ends of the battery 350 to the seating groove 332a, and thus, the adhesion surface between the battery 350 and the seating groove 332a may be enlarged. Accordingly, the battery 350 may be stably positioned in the electronic device.

Figure 8:
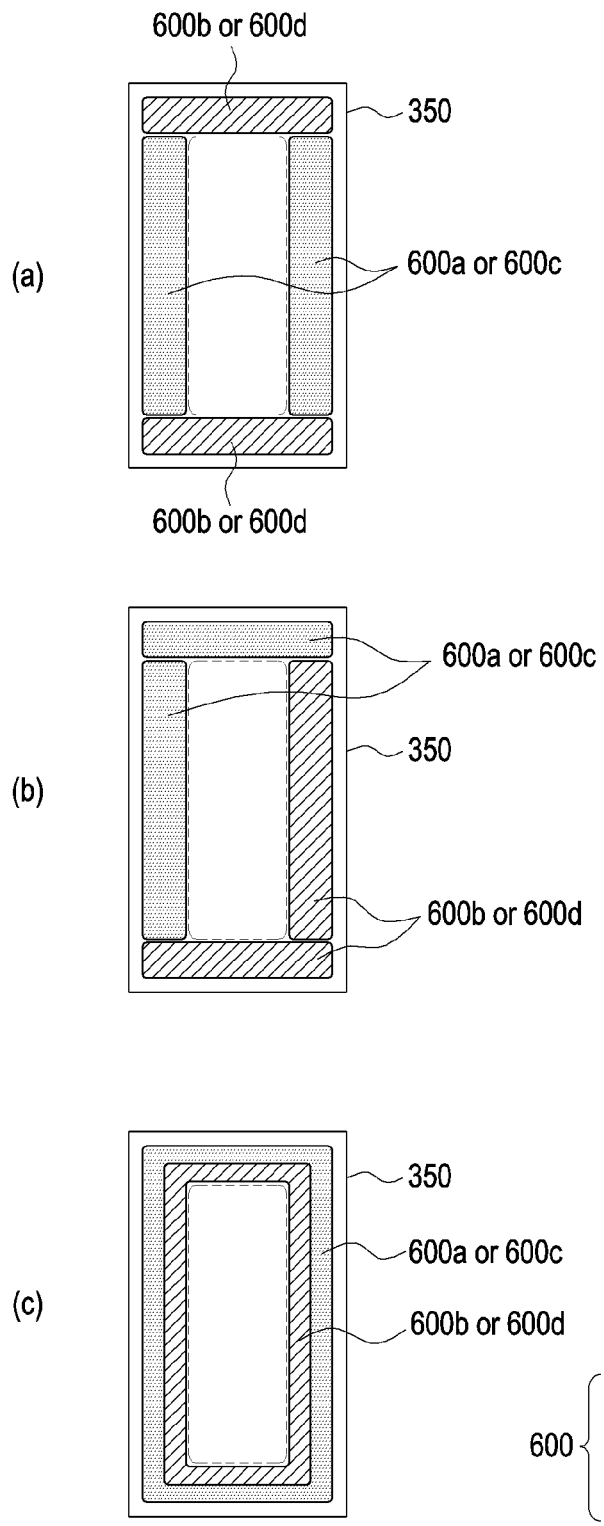
FIG. 8 is a view illustrating a relationship in which an adhesive member using a plurality of (two) materials is disposed in an area of a battery according to various embodiments of the present disclosure.

FIG. 8 is a view illustrating a relationship in which an adhesive member using a plurality of materials is disposed in an area of a battery according to various embodiments of the present disclosure. (a), (b), and (c) of FIG. 8 illustrate an adhesive member disposed in one area of the battery in different ways.

In FIG. 8, the "X-axis" of the 2-axis orthogonal coordinate system may indicate the horizontal length direction (X-axis direction) of the battery 350, and the "Y-axis" may indicate the vertical length direction (Y-axis direction) of the battery 350.

Referring to FIG. 8, an electronic device (e.g., the electronic device 101 of FIGS. 1 to 4) may include a battery 350 and an adhesive member 600 for fixing the battery 350 to a seating groove (e.g., a seating groove 332a of FIG. 7). The battery 350 and the adhesive member 600 of FIG. 8 may be wholly or partially identical in structure to the battery 350 and the adhesive member 600 of FIGS. 6A to 7.

According to various embodiments, the battery 350, as an electrode assembly, may be a reversibly bendable flexible jelly roll-type secondary battery. The adhesive member 600 may be disposed along an edge of one surface of the battery 350. For example, since a central area of the battery 350 may swell during a charging or discharging operation, the adhesive member 600 may be disposed along the edge area except for the central region.

According to various embodiments, there may be provided a plurality of adhesive members 600, which may be formed of different materials. For example, the adhesive members 600 may include a first adhesive member 600a and a second adhesive member 600b. As another example, the adhesive members 600 may include a third adhesive member 600c and a fourth adhesive member 600d.

According to an embodiment, the first adhesive member 600a may include a material having relatively superior low-temperature properties to the second adhesive member 600b. The first adhesive member 600a may include a material having excellent low-temperature properties, for example, a material having a Tg of −30 to −20 degrees Celsius and a softening point of 90 to 100 degrees Celsius. As another example, the first adhesive member 600a may include a material having a Tg of about −25 degrees and a softening point of about 95 degrees. The first adhesive member 600a may include at least one of butyl rubber, poly-isobutylene, isoprene, and butadiene, as a base material. The second adhesive member 600b may include a material having excellent high-temperature properties, for example, a material having a Tg of −7 to 0 degrees Celsius and a softening point of 125 to 135 degrees Celsius. As another example, the first adhesive member 600a may include a material having a Tg of about −2 degrees and a softening point of about 130 degrees. The second adhesive member 600b may include styrene polymer as a base material. Two types of adhesive members having different properties (first adhesive member 600a and second adhesive member 600b) may be disposed between the battery 350 and the seating groove 332a, rendering it possible to maintain strong adhesion against impact in high temperature conditions, as well as internal or external impact. Accordingly, the battery 350 may be stably positioned in the electronic device.

According to still another embodiment, the third adhesive member 600c may include a material having relatively superior dynamic properties to the fourth adhesive member 600d. The third adhesive member 600c may include a material having excellent dynamic properties, for example, a material having a push-out of 4 to 5 kgf and a dupont of 380 to 480 mJ. As another example, the third adhesive member 600c may include a material having a push-out of about 4.5 kgf and a dupont of about 430 mJ. The push-out may mean a force required to push and separate the first adhesive member 600a, and the dupont may mean a test for identifying the impact-resistance performance of a specimen by dropping a weight on the specimen. The third adhesive member 600c may include an elastomer (soft) as a base material. The fourth adhesive member 600d may include a material having excellent static properties, for example, a material having a push-out of 10 to 20 kgf and a dupont of 61 to 71 mJ. As another example, the third adhesive member 600c may include a material having a push-out of about 15 kgf and a dupont of about 430 mJ. The fourth adhesive member 600d may include a styrenic copolymer (hard) as a base material. Two types of adhesive members having different properties (the third adhesive member 600c and the fourth adhesive member 600d) are disposed between the battery 350 and the seating groove 332a, allowing for flexibly responding to internal impact in some areas and strong adhesion in other areas. Accordingly, the battery 350 may be stably positioned in the electronic device.

According to various embodiments, the adhesion area formed along the edge of the battery 350 may be divided into a first adhesion area and a second adhesion area depending on the type of the adhesive member 600. For example, at least one of the first adhesive member 600a or the second adhesive member 600b may be disposed in the first adhesive region, and the other of the first adhesive member 600a or the second adhesive member 600b may be disposed in the second adhesive region. As another example, at least one of the third adhesive member 600c or the fourth adhesive member 600d may be disposed in the first adhesive region, and the other of the third adhesive member 600c or the fourth adhesive member 600d may be disposed in the second adhesive region. The first adhesive regions may be formed, apart from each other, at both sides of the battery 350 along the vertical length direction (Y-axis direction). The second adhesive regions may be formed, apart from each other, at both sides of the battery 350 along the horizontal length direction (X-axis direction).

According to various embodiments, the area in which the first adhesive member 600a is disposed may be equal to or larger in size than the area in which the second adhesive member 600b is disposed. For example, when the first adhesive member 600a is formed of a material having excellent low-temperature properties, and the second adhesive member 600b is formed of a material having excellent high-temperature properties, the adhesive member having relatively excellent low-temperature properties may be disposed in a larger area.

According to various embodiments, the area in which the third adhesive member 600c is disposed may be equal to or larger in size than the area in which the fourth adhesive member 600d is disposed. For example, when the third adhesive member 600c is formed of a material having excellent dynamic properties, and the fourth adhesive member 600d is formed of a material having excellent static properties, the adhesive member having relatively excellent dynamic properties may be disposed in a larger area.

Referring to (a) in FIG. 8, the first adhesive member 600a (or the third adhesive member 600c) may be disposed in the vertical length direction (Y-axis direction) of the battery 350 and may be disposed in each of the first adhesion areas spaced apart from each other along the edge. The second adhesive member 600b (or the fourth adhesive member 600d) may be disposed in the horizontal length direction (X-axis direction) and may be disposed in each of the second adhesive regions spaced apart from each other along the edge. For example, the first adhesion area may have a larger area as compared to the second adhesive region, and accordingly, the first adhesive member 600a having excellent low-temperature properties may exhibit more performance. As another example, as the first adhesion area has a larger area than the second adhesive region, the impact-resistance performance may be further exhibited by the third adhesive member 600c having excellent dynamic properties. However, the arrangement is not limited thereto, and depending on the conditions of the manufacturing or use environment, a change may be made to the design so that the second adhesive member 600b (or the fourth adhesive member 600d) having excellent high-temperature properties or excellent static properties is placed in a larger area.

Referring to (b) in FIG. 8, the first adhesive member 600a (or the third adhesive member 600c) may be disposed in a first adhesion area formed along the edge in the vertical length direction (Y-axis direction) of the battery 350 and a second adhesion area formed along the edge of the battery 350 in the horizontal direction (X-axis direction). For example, the first adhesive member 600a (or the third adhesive member 600c) may be disposed in a line having a designated width in an upper area and left area of the battery. The second adhesive member 600b (or the fourth adhesive member 600d) may be disposed in the first adhesion area disposed in the vertical length direction (Y-axis direction) of the battery 350 and formed along the edge and the second adhesion area disposed in the horizontal length direction (X-axis direction) and formed along the edge. For example, the second adhesive member 600b (or the fourth adhesive member 600d) may be disposed in a line having a designated width in an lower area and right area of the battery. The area where the first adhesive member 600a (or the third adhesive member 600c) is disposed may be identical in size to the area where the second adhesive member 600b (or the fourth adhesive member 600d) is disposed. Accordingly, it is possible to maintain excellent low-temperature properties or high-temperature properties in a balanced manner. As another example, it is possible to maintain excellent dynamic properties or static properties in a balanced manner.

Referring to (c) in FIG. 8, the first adhesive member 600a (or the third adhesive member 600c) may be disposed along the edge of the battery 350. For example, the first adhesive member 600a (or the third adhesive member 600c) may extend in a line having a designated width in upper and lower regions and left and right regions of the battery. The second adhesive member 600b (or the fourth adhesive member 600d) may be disposed along the edge of the battery 350 toward the inside of the first adhesive member 600a (or the third adhesive member 600c). For example, the second adhesive member 600b (or the fourth adhesive member 600d) may extend in a line having a designated width in upper and lower regions and left and right regions of the battery. For example, the area where the first adhesive member 600a is disposed may be larger than the area in which the second adhesive member 600b is disposed, and accordingly, the first adhesive member 600a having excellent low-temperature properties may exhibit more performance. As another example, as the area in which the third adhesive member 600c is disposed is larger than the area in which the fourth adhesive member 600d is disposed, more performance may be exhibited from the third adhesive member 600c having excellent dynamic properties and impact-resistance properties. However, the arrangement is not limited thereto, and depending on the conditions of the manufacturing or use environment, a change may be made to the design so that the second adhesive member 600b (or the fourth adhesive member 600d) having excellent high-temperature properties or excellent static properties is placed in a larger area.

Figure 9:
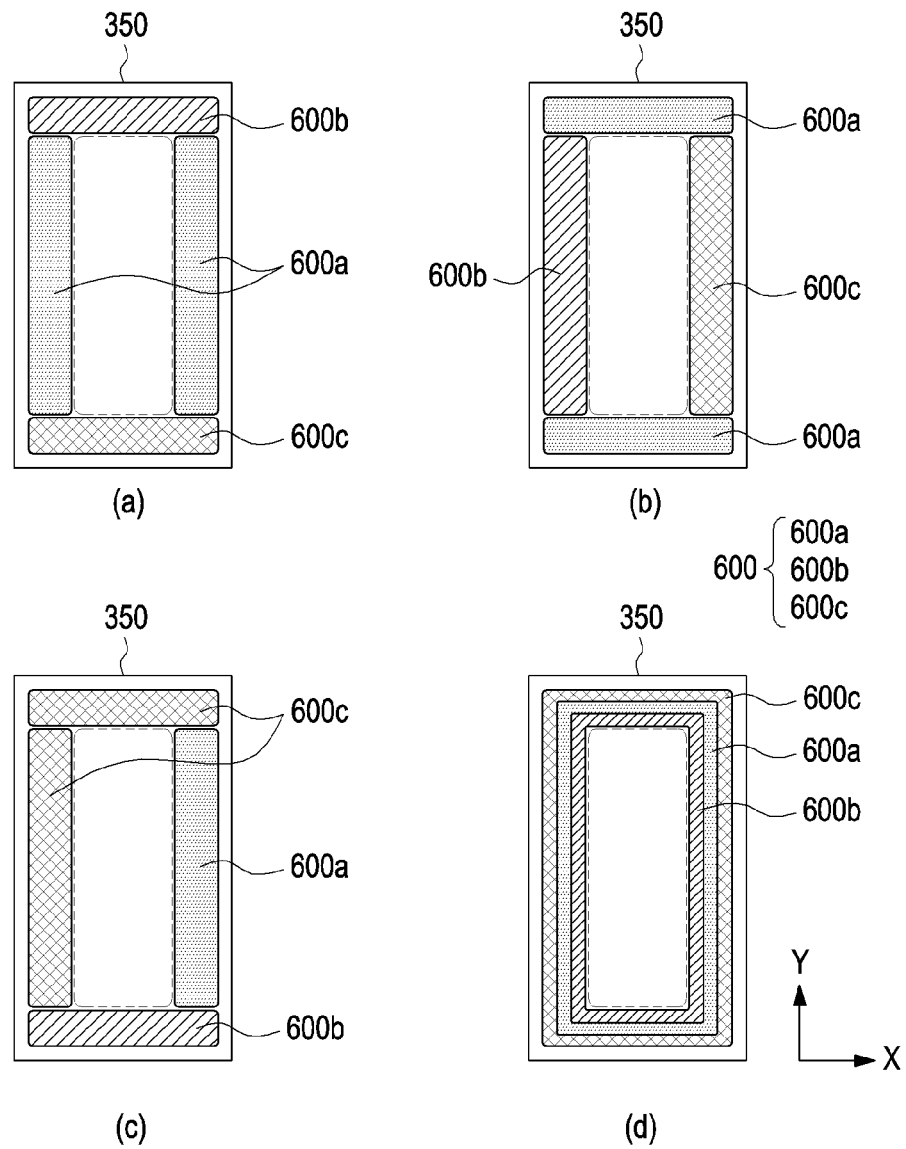
FIG. 9 is a view illustrating a relationship in which an adhesive member using a plurality of (three) materials is disposed in an area of a battery according to other embodiments of the present disclosure.

FIG. 9 is a view illustrating a relationship in which an adhesive member using a plurality of materials is disposed in an area of a battery according to other embodiments of the present disclosure. (a), (b), (c), and (d) of FIG. 9 illustrate an adhesive member disposed in one area of the battery in different ways.

Referring to FIG. 9, an electronic device (e.g., the electronic device 101 of FIGS. 1 to 4) may include a battery 350 and an adhesive member 600 for fixing the battery 350 to a seating groove (e.g., a seating groove 332a of FIG. 7). The battery 350 and the adhesive member 600 of FIG. 9 may be wholly or partially identical in structure to the battery 350 and the adhesive member 600 of FIGS. 6A to 8.

According to various embodiments, the battery 350, as an electrode assembly, may be a reversibly bendable flexible jelly roll-type secondary battery. The adhesive member 600 may be disposed along an edge of one surface of the battery 350. According to various embodiments, there may be provided a plurality of adhesive members 600, which may be formed of different materials. For example, the adhesive members 600 may include a first adhesive member 600a, a second adhesive member 600b, and a third adhesive member 600c. The properties of the first adhesive member 600a, the second adhesive member 600b, and the third adhesive member 600c of FIG. 8 may be applied to the properties of the first adhesive member 600a, the second adhesive member 600b, and the third adhesive member 600c.

Three types of adhesive members having different properties (first adhesive member 600a, second adhesive member 600b, and third adhesive member 600c) may be disposed between the battery 350 and the seating groove 332a, rendering it possible to maintain strong adhesion against impact in high temperature conditions, as well as internal or external impact. As another example, it is possible to flexibly respond to internal impact in some areas. Accordingly, the battery 350 may be stably positioned in the electronic device.

Referring to (a) in FIG. 9, the first adhesive members 600a may be disposed in regions spaced apart from each other along the edge in the vertical length direction (Y-axis direction) of the battery 350. The second adhesive member 600b and the third adhesive member 600c, respectively, may be disposed in regions spaced apart from each other along the edge in the horizontal length direction (X-axis direction). For example, the first adhesive member 600a may be disposed in left and right regions of the battery 350, the second adhesive member 600b may be disposed in an upper area of the battery 350, and the third adhesive member 600c may be disposed in a lower area of the battery 350. As another example, the first adhesive member 600a may be disposed in left and right regions of the battery 350, the second adhesive member 600b may be disposed in a lower area of the battery 350, and the third adhesive member 600c may be disposed in an upper area of the battery 350.

According to an embodiment, the area where the first adhesive member 600a is disposed may be larger than the area in which the second adhesive member 600b and/or the third adhesion area 600c is disposed, and accordingly, the first adhesive member 600a having excellent low-temperature properties may exhibit more performance. However, the arrangement is not limited thereto, and depending on the conditions of the manufacturing or use environment, a change may be made to the design so that the adhesive member having excellent high-temperature properties or excellent dynamic properties is placed in a larger area.

Referring to (b) in FIG. 9, the first adhesive members 600a may be disposed in regions spaced apart from each other along the edge in the horizontal length direction (X-axis direction) of the battery 350. The second adhesive member 600b and the third adhesive member 600c, respectively, may be disposed in regions spaced apart from each other along the edge in the vertical length direction (Y-axis direction). For example, the first adhesive member 600a may be disposed in upper and lower regions of the battery 350, the second adhesive member 600b may be disposed in a left area of the battery 350, and the third adhesive member 600c may be disposed in a right area of the battery 350. As another example, the first adhesive member 600a may be disposed in upper and lower regions of the battery 350, the second adhesive member 600b may be disposed in a left area of the battery 350, and the third adhesive member 600c may be disposed in a right area of the battery 350.

According to an embodiment, the area where the first adhesive member 600a is disposed may be larger than the area in which the second adhesive member 600b and/or the third adhesion area 600c is disposed, and accordingly, the first adhesive member 600a having excellent low-temperature properties may exhibit more performance. However, the arrangement is not limited thereto, and depending on the conditions of the manufacturing or use environment, a change may be made to the design so that the adhesive member having excellent high-temperature properties or excellent dynamic properties is placed in a larger area.

Referring to (c) in FIG. 9, the first adhesive member 600a may be disposed along the edge in the vertical length direction (Y-axis direction) of the battery 350. The second adhesive member 600b may be disposed along the edge in the horizontal length direction (X-axis direction) of the battery 350. The third adhesive member 600c may be disposed to extend along the edge in the vertical length direction (Y-axis direction) and the horizontal length direction (X-axis direction). For example, the first adhesive member 600a may be disposed in a right area of the battery 350, the second adhesive member 600b may be disposed in a lower area of the battery 350, and the third adhesive member 600c may be disposed in upper and left areas of the battery 350.

According to an embodiment, the area in which the third adhesive member 600c is disposed may be larger than the area in which the first adhesive member 600a and/or the second adhesive member 600b is disposed. The area in which the first adhesive member 600a is disposed may be larger than the area in which the second adhesive member 600b is disposed. Accordingly, the performance of the third adhesive member 600c having excellent dynamic properties may be exhibited most, and then, the performance of the first adhesive member 600a having excellent low-temperature properties and the performance of the second adhesive member 600b having excellent high-temperature properties may be exhibited in order. Since electronic devices are typically used at room temperature, the material having excellent dynamic properties may be placed in the largest area and the material having excellent low-temperature properties may be disposed in the next largest area. However, the arrangement is not limited thereto, and depending on the conditions of the manufacturing or use environment, a change may be made to the design so that the adhesive member having excellent low-temperature properties or excellent static properties is placed in a larger area.

Referring to (d) in FIG. 9, the third adhesive member 600c may be disposed along the edge of the battery 350. For example, the third adhesive member 600c may extend in a line having a designated width in upper and lower regions and left and right regions of the battery. The first adhesive member 600a may be disposed along the edge of the battery 350 toward the inside of the third adhesive member 600c. For example, the first adhesive member 600a may extend in a line having a designated width in upper and lower regions and left and right regions of the battery. The second adhesive member 600b may be disposed along the edge of the battery 350 toward the inside of the first adhesive member 600a. For example, the second adhesive member 600b may extend in a line having a designated width in upper and lower regions and left and right regions of the battery.

According to an embodiment, the area in which the third adhesive member 600c is disposed may be larger than the area in which the first adhesive member 600a and/or the second adhesive member 600b is disposed. The area in which the first adhesive member 600a is disposed may be larger than the area in which the second adhesive member 600b is disposed. Accordingly, the performance of the third adhesive member 600c having excellent dynamic properties may be exhibited most, and then, the performance of the first adhesive member 600a having excellent low-temperature properties and the performance of the second adhesive member 600b having excellent high-temperature properties may be exhibited. However, the arrangement is not limited thereto, and depending on the conditions of the manufacturing or use environment, a change may be made to the design so that the adhesive member having excellent low-temperature properties or excellent static properties is placed in a larger area.

Figure 10:
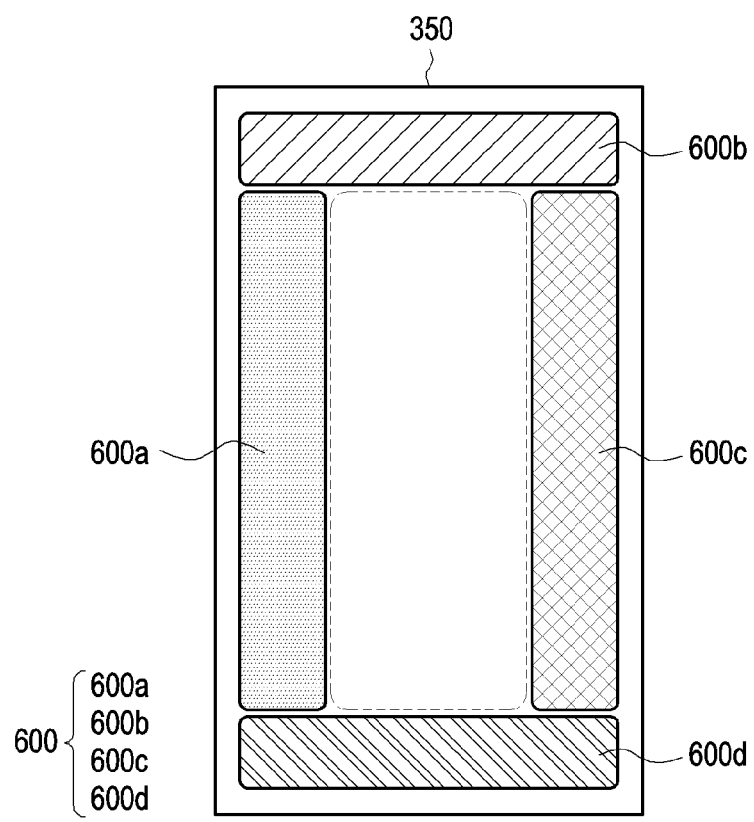
FIG. 10 is a view illustrating a relationship in which an adhesive member using a plurality of (four) materials is disposed in an area of a battery according to still other embodiments of the present disclosure.

FIG. 10 is a view illustrating a relationship in which an adhesive member using a plurality of materials is disposed in an area of a battery according to still other embodiments of the present disclosure.

Referring to FIG. 10, an electronic device (e.g., the electronic device 101 of FIGS. 1 to 4) may include a battery 350 and an adhesive member 600 for fixing the battery 350 to a seating groove (e.g., a seating groove 332a of FIG. 7). The battery 350 and the adhesive member 600 of FIG. 10 may be wholly or partially identical in structure to the battery 350 and the adhesive member 600 of FIGS. 6A to 9.

According to various embodiments, the battery 350, as an electrode assembly, may be a reversibly bendable flexible jelly roll-type secondary battery. The adhesive member 600 may be disposed along an edge of one surface of the battery 350. According to various embodiments, there may be provided a plurality of adhesive members 600, which may be formed of different materials. For example, the adhesive members 600 may include a first adhesive member 600a, a second adhesive member 600b, a third adhesive member 600c, and a fourth adhesive member 600d. The properties of the first adhesive member 600a, the second adhesive member 600b, the third adhesive member 600c, and the fourth adhesive member 600d of FIG. 8 may be applied to the properties of the first adhesive member 600a, the second adhesive member 600b, the third adhesive member 600c, and the fourth adhesive member 600d.

According to various embodiments, four types of adhesive members having different properties (first adhesive member 600a, second adhesive member 600b, third adhesive member 600c, and fourth adhesive member 600d) may be disposed between the battery 350 and the seating groove 332a, rendering it possible to maintain strong adhesion against impact in high temperature conditions, as well as internal or external impact. Further, it is possible to provide relatively very strong adhesion in some areas while maintaining the ability to flexibly respond to internal impact in other areas. Accordingly, the battery 350 may be stably positioned in the electronic device under various manufacturing and use conditions.

According to an embodiment, the first adhesive member 600a and the third adhesive member 600c, respectively, may be disposed in regions spaced apart from each other along the edge in the vertical length direction (Y-axis direction) of the battery 350. The second adhesive member 600b and the fourth adhesive member 600d, respectively, may be disposed in regions spaced apart from each other along the edge in the horizontal length direction (X-axis direction). For example, the first adhesive member 600a may be disposed in a left area of the battery 350, the third adhesive member 600c may be disposed in a right area of the battery 350, the second adhesive member 600b may be disposed in an upper area of the battery 350, and the fourth adhesive member 600d may be disposed in a lower area of the battery 350.

According to an embodiment, the area where the first adhesive member 600a and the third adhesive member 600c are disposed may be larger than the area in which the second adhesive member 600b and/or the fourth adhesion area 600d is disposed, and accordingly, the performance of the first adhesive member 600a having excellent low-temperature properties and the performance of the third adhesive member 600c having excellent dynamic properties may be further exhibited. When the electronic device is subjected to an environment in which the electronic device is arranged with components in which specific temperature conditions and loads are reinforced, it is possible to use adhesive members evenly having various properties. However, the arrangement is not limited thereto, and depending on the conditions of the manufacturing or use environment, a change may be made to the design so that the adhesive member having excellent low-temperature properties or excellent static properties is placed in a larger area.

Figure 11:
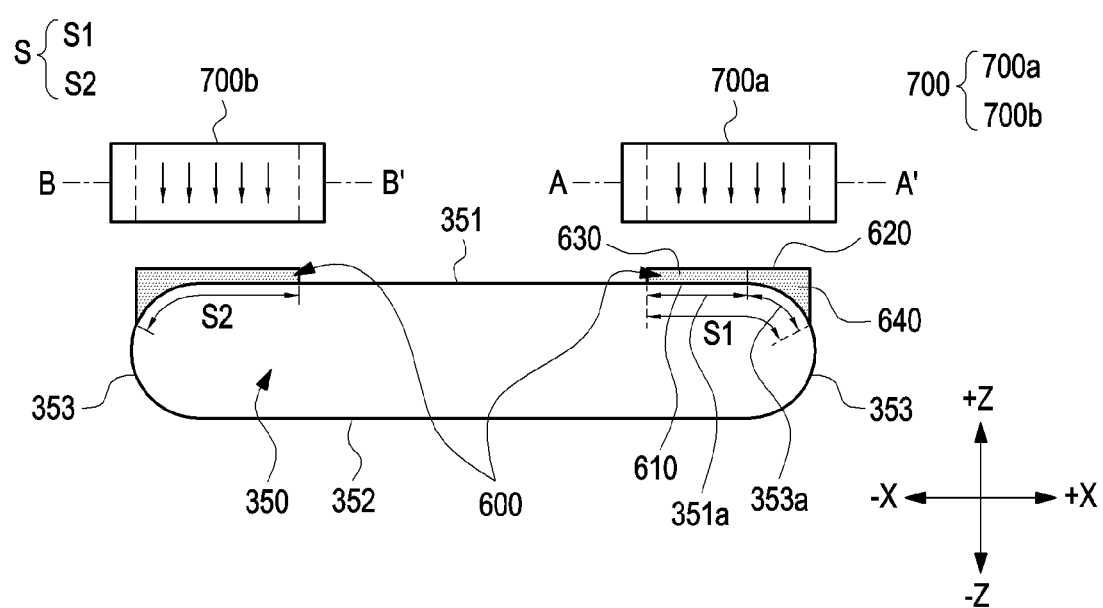
FIG. 11 is a view illustrating a nozzle structure of an application mechanism for applying an adhesive member to one surface of a battery according to various embodiments of the present disclosure.

FIG. 11 is a view illustrating a nozzle structure of an application mechanism for applying an adhesive member to one surface of a battery according to various embodiments of the present disclosure.

Figure 12A:
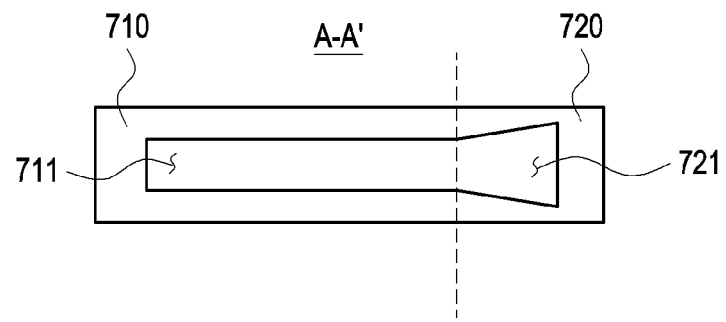
FIGS. 12A and 12B are cross-sectional views illustrating a cross-sectional shape of the nozzle structure of FIG. 11 according to various embodiments of the present disclosure.
Figure 12B:
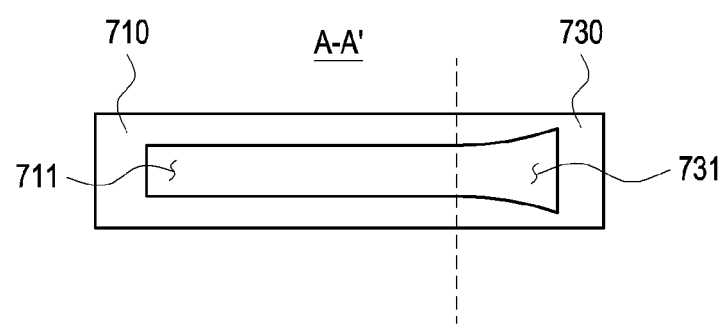

FIGS. 12A and 12B are cross-sectional views illustrating a cross-sectional shape of the nozzle structure of FIG. 11 according to various embodiments of the present disclosure.

The battery 350 and the adhesive member 600 of FIG. 11 may be wholly or partially identical in structure to the battery 350 and the adhesive member 600 of FIGS. 6A and 6B.

According to various embodiments, the adhesion area of the battery 350 may be divided into a first adhesion area S1 and a second adhesion area S2 disposed apart from each other. The first adhesion area S1 and the second adhesion area S2 may be provided in an area and shape corresponding to each other.

According to various embodiments, when the adhesive member 600 is disposed in the adhesion area S, a predetermined thickness may be formed from one surface of the battery 350. A description of the first adhesion area S1 is given below, and may apply to the second adhesion area S2. The adhesive member 600 may include a first adhesion surface 610 in contact with the first adhesion area S of the battery 350 and a second adhesion surface 620 facing in a direction opposite to the first adhesion surface 610 and contacting the seating groove (e.g., the seating groove 332a of FIG. 5). The second adhesion surface 620 may form a horizontal surface parallel to the first surface 351 of the battery 350.

According to various embodiments, the adhesive member 600 may include a first portion 630 disposed in the end area 351a of the battery 350 and a second portion 640 disposed on the first curved surface 353a of the battery 350. The first portion 630 may have the same thickness, and the second portion 640 extending from the first portion 630 may have a variable thickness outwards.

According to various embodiments, a nozzle structure 700 of an application mechanism may have both ends formed differently to dispose the adhesive member 600 in a shape corresponding to the first adhesion area S1 of the battery 350. For example, at cross-sectional view (e.g., the cross section taken along line A-A of FIG. 12A or the cross section taken along line B-B of FIG. 12B) of the nozzle structure 700, a flat portion 710 and curved portions 720 and 730 may be included. The flat portion 710 forms a parallel horizontal surface to correspond to the end area 351a of the battery 350, and the curved portions 720 and 730 may have a designated inclination to correspond to the first curved surfaces 353a of the battery 350.

Referring to FIG. 12A, a first discharge port 711 having a rectangular shape may be formed in the flat portion 710 of the nozzle structure 700, so that a melted adhesive material may be discharged. The discharged adhesive material may be applied onto the end area 351a of the battery 350. The curved portion 720 of the nozzle structure 700 may be formed with a second discharge port 721 having a designated inclination, so that the melted adhesive material may be discharged. The discharged adhesive material may be applied onto the first curved surface 353a of the battery 350.

Referring to FIG. 12B, a first discharge port 711 having a rectangular shape may be formed in the flat portion 710 of the nozzle structure 700, so that a melted adhesive material may be discharged. The discharged adhesive material may be applied onto the end area 351a of the battery 350. The curved portion 730 of the nozzle structure 700 may be formed with a third discharge port 731 having an inclination varying along the length direction, so that the melted adhesive material may be discharged. Unlike the second discharge port 721, the third discharge port 731 may be formed as an opening including a curved surface. The discharged adhesive material may be applied onto the first curved surface 353a of the battery 350.

According to various embodiments, a relatively large amount of adhesive material may be applied onto the first curved surface 353a, in terms of thickness, as compared to the end area 351a. To that end, the second discharge port 721 and/or the third discharge port 731 of the nozzle structure 700 may form an opening that widens toward the outside. Accordingly, the nozzle structure 700 may stably apply an amount of adhesive material, corresponding to the increased thickness (e.g., from the first designated thickness t1 to the second designated thickness t2 in FIG. 6B), onto the first curved surface 353a of the battery 350.

Figure 13:
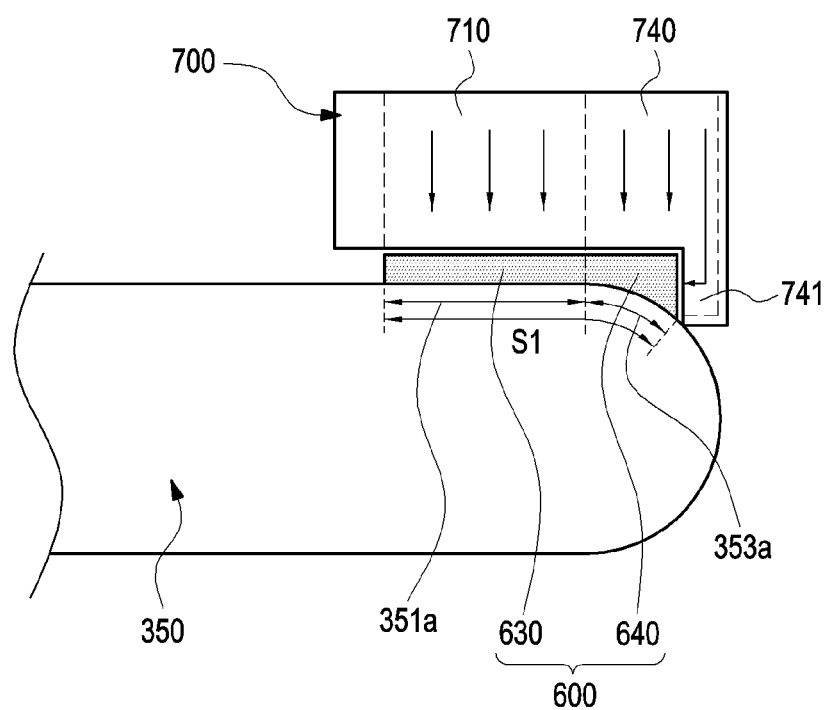
FIG. 13 is a view illustrating a nozzle structure of an application mechanism for applying an adhesive member to one surface of a battery according to various embodiments of the present disclosure.

FIG. 13 is a view illustrating a nozzle structure of an application mechanism for applying an adhesive member to one surface of a battery according to various embodiments of the present disclosure.

The battery 350 and the adhesive member 600 of FIG. 13 may be wholly or partially identical in structure to the battery 350 and the adhesive member 600 of FIGS. 6A and 6B. The nozzle structure 700 of FIG. 13 may be the same in whole or part as the nozzle structure 700 of FIGS. 11, 12A, and 12B.

According to various embodiments, the nozzle structure 700 may have both ends formed differently to dispose the adhesive member 600 in a shape corresponding to the first adhesion area S1 of the battery 350. For example, the nozzle structure 700 may include a flat portion 710 and a curved portion 740. The flat portion 710 forms a parallel horizontal surface to correspond to the end area 351a of the battery 350, and the curved portion 740 may have a designated inclination to correspond to the first curved surfaces 353a of the battery 350. The cross-section of the curved portion 740 may be partially identical in structure to that of the curved portions 720 and 730 of FIG. 12A or 12B.

According to various embodiments, the curved portion 740 may include a guide portion protruding downwards. The guide portion 741 may prevent the molten adhesive material provided through the discharge port from flowing down to the outside of the curved portion 740. The guide portion 741 is formed not to contact the battery 350 and may protrude as high as the increased thickness (e.g., from the first designated thickness t1 to the second designated thickness t2 in FIG. 6B), from the surface forming the flat portion 710 to the first curved surface 353a of the battery 350. As another example, a sheet of release-coated contact paper may be disposed on one surface of the guide portion 741 to prevent the adhesive member 600 adhered to the battery 350 from sticking to the guide portion 741. The release-coated contact paper may include various materials capable of lowering surface energy so that no adhesion to the adhesive material occurs.

According to various embodiments, the adhesive material discharged from the flat portion 710 of the nozzle structure 700 may be provided to the end area 351a of the battery 350 in a vertical direction, and the adhesive material discharged from the guide portion 741 of the nozzle structure 700 may be provided in a direction (e.g., a direction perpendicular to the flat portion 710) corresponding to the first curved surface 353a of the battery. Accordingly, it is possible to safely apply the adhesive member 600 corresponding to the shape of the battery 350.

Figure 14:
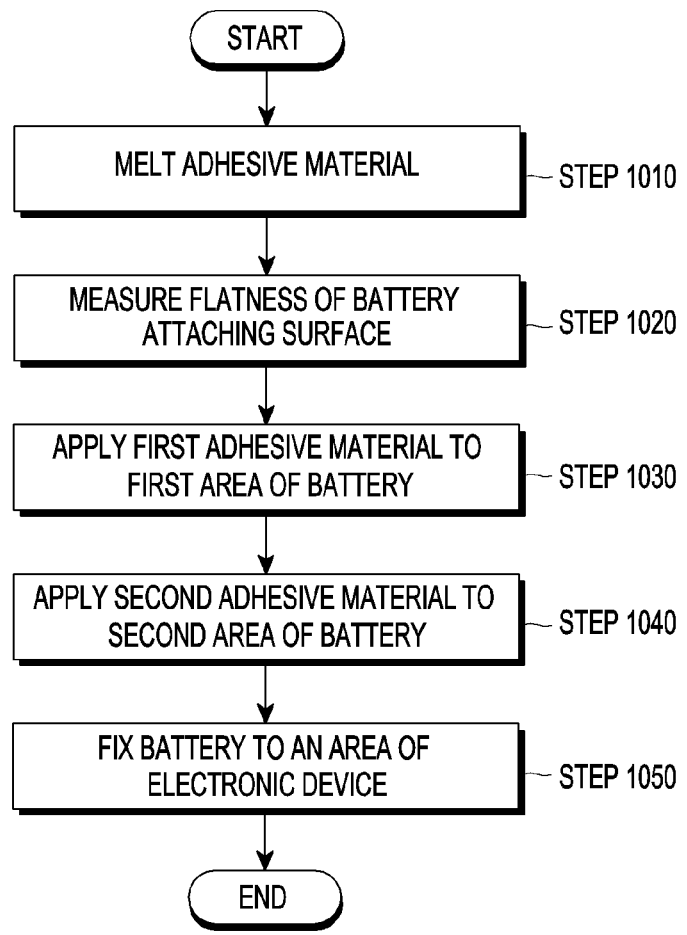
FIG. 14 is a flowchart illustrating applying an adhesive member to one surface of a battery according to various embodiments of the disclosure.

FIG. 14 is a flowchart illustrating applying an adhesive member to one surface of a battery according to various embodiments of the disclosure.

The battery and the adhesive member of FIG. 14 may be wholly or partially identical in structure to the battery 350 and the adhesive member 600 of FIGS. 6A and 6B. The nozzle structure of FIG. 14 may be the same in whole or part as the nozzle structure 700 of FIGS. 11 to 13.

According to various embodiments, an application mechanism including a nozzle structure may be used to provide the adhesive member to one surface of the battery. The application mechanism may include a storage unit for storing the adhesive material and a nozzle structure for discharging the adhesive material. As another example, the discharge port of the nozzle structure may have a specific shape to provide the adhesive member corresponding to the shape of the battery including a curved surface.

First, before providing the adhesive material to one surface of the battery, the application mechanism may melt the adhesive material stored in the storage unit (step 1010).

Thereafter, the flatness of the adhesion surface of the battery may be measured (step 1020). This may be a process for maintaining a designated gap between the nozzle structure and the applied surface of the battery and, according to the measured flatness, the position of the nozzle structure may be set.

Then, a first adhesive material may be applied to the first area of the battery (step 1030). For example, the first area of the battery may be an upper or lower area of the battery. As another example, as the nozzle structure facing the first area, a nozzle structure with a uniform width may be used. As another example, the first adhesive material may be applied to the battery, forming at least one of the first adhesive member 600a, the second adhesive member 600b, the third adhesive member 600c, and the fourth adhesive member 600d of FIG. 8.

Thereafter, a second adhesive material may be applied to the second area of the battery (step 1040). For example, the second area of the battery may be a left or right area of the battery, and the left or right area may include a curved surface. As another example, the nozzle structure facing the second area may include a flat portion (e.g., the flat portion 710 of FIG. 12A) and a curved portion (e.g., the curved portions 720 and 730 of FIG. 12A). As another example, the second adhesive material may be applied to the battery, forming at least one of the first adhesive member 600a, the second adhesive member 600b, the third adhesive member 600c, and the fourth adhesive member 600d of FIG. 8.

However, the first area and the second area may be one of various positions of the battery of FIGS. 8 to 10 described above, and the adhesive member applied in various positions may include one or more materials. For example, when the adhesive member is formed of a plurality of materials, a material having excellent low-temperature properties, a material having excellent high-temperature properties, a material having excellent dynamic properties, and a material having excellent static properties may be selectively disposed depending on the adhesion area.

Thereafter, the battery in which the adhesive material is disposed may be attached in the seating groove of the electronic device and pressed and fixed (step 1050).

According to various embodiments of the disclosure, an electronic device (e.g., the electronic device 101 of FIGS. 1 to 4) comprises a housing (e.g., the housing 310 of FIGS. 2 and 3) including a seating groove (e.g., the seating groove 332a of FIG. 7), a battery (e.g., the battery 350 of FIG. 6A) seated in the seating groove and including at least a portion in a curved shape, and an adhesive member (e.g., the adhesive member 600 of FIG. 6A) disposed between the battery and the seating groove and formed along at least a portion of an edge of the battery. The adhesive member may be formed to have a different designated thickness corresponding to a position of the battery.

According to various embodiments, the adhesive member may be prepared to include a liquid material.

According to various embodiments, the battery may include a first surface (e.g., the first surface 351 of FIG. 6A) facing in a first direction, a second surface (e.g., the second surface 352 of FIG. 6A) facing in a second direction opposite to the first direction, and a side surface (e.g., the side surface 353 of FIG. 6A) facing in a direction different from the first direction and the second direction and including the curved shape. An edge area of the battery, in which the adhesive member is disposed, may include a portion extending from a partial area of the first surface to a partial area of the side surface.

According to various embodiments, in the adhesive member, a portion disposed in the partial area of the first surface forms a designated first thickness (e.g., the designated first thickness t1 of FIG. 6A) and a portion disposed in the partial area of the side surface forms a designated second thickness (e.g., the designated second thickness t2 of FIG. 6A). The designated second thickness may be greater than the designated first thickness.

According to various embodiments, the side surface of the battery may include a first curved surface (e.g., the first curved surface 353a of FIG. 6A) extending from an end portion of the first surface and a second curved surface (e.g., the second curved surface 353b of FIG. 6A) extending from an end portion of the second surface. The adhesive member disposed on the first curved surface may be bent from the end portion of the first surface and extend to an area corresponding to half the thickness of the battery.

According to various embodiments, the adhesive member may include a first adhesion surface (e.g., the first adhesion surface 610 of FIG. 6A) for bonding with the battery and a second adhesion surface (e.g., the second adhesion surface 620 of FIG. 6A) for bonding with the seating groove, and the first adhesion surface may form a curved surface corresponding to the curved shape of the battery, and the second adhesion surface may be formed as a horizontal surface having a uniform flatness.

According to various embodiments, the adhesive member may include a first adhesive member and a second adhesive member. The first adhesive member may be disposed along a length direction of a side of the battery, and the second adhesive member may be disposed along a length direction of another side of the battery.

According to various embodiments, the adhesive member includes a plurality of adhesive members, and each of the plurality of adhesive members may be formed of a different material.

According to various embodiments, the adhesive member may include a first adhesive member (e.g., the first adhesive member 600a of FIG. 8) and a second adhesive member (e.g., the second adhesive member 600b of FIG. 8). The first adhesive member may be formed of a material having a low-temperature property, including at least one of butyl rubber, poly-isobutylene, isoprene, and butadiene, as a base material, and the second adhesive member may be formed of a material having a high-temperature property, including a styrene polymer, as a base material.

According to various embodiments, the first adhesive member including the material having the low-temperature property may be a material having a Tg of −30 to −20 degrees and a softening point of 90 to 100 degrees, and the second adhesive member including the high-temperature property may be a material having a Tg of −7 to 0 degrees and a softening point of 125 to 135 degrees.

According to various embodiments, the adhesive member may include a first adhesive member (e.g., the third adhesive member 600c of FIG. 8) and a second adhesive member (e.g., the fourth adhesive member 600d of FIG. 8). The first adhesive member may be formed of a material having a dynamic property, including an elastomer (soft), as a base material, and the second adhesive member may be formed of a material having a static property, including a styrenic copolymer (hard), as a base material.

According to various embodiments, the first adhesive member including the material having the dynamic property may be a material having a push-out of 4.0 to 5.0 kgf and a dupont of 380 to 480 mJ, and the second adhesive member including the static property may be a material having a push-out of 10 to 20 kgf and a dupont of 61 to 71 mJ.

According to various embodiments, an area formed by a first adhesive member disposed on the battery may be equal to or larger than an area formed by a second adhesive member disposed on the battery.

According to various embodiments, the adhesive member may include a first adhesive member (e.g., the first adhesive member 600a of FIG. 9), a second adhesive member (e.g., the second adhesive member 600b of FIG. 9), and a third adhesive member (e.g., the third adhesive member 600d of FIG. 9). The first adhesive member may be a material including a material having a low-temperature property and having a Tg of −30 to −20 degrees and a softening point of 90 to 100 degrees. The second adhesive member may be a material including a material having a high-temperature property and having a Tg of −7 to 0 degrees and a softening point of 125 to 135 degrees. The third adhesive member may be a material including a material having a dynamic property and having a push-out of 4.0 to 5.0 kgf and a dupont of 380 to 480 mJ.

According to various embodiments, the adhesive member may include a first adhesive member (e.g., the first adhesive member 600a of FIG. 10), a second adhesive member (e.g., the second adhesive member 600b of FIG. 10), a third adhesive member (e.g., the third adhesive member 600c of FIG. 10), and a fourth adhesive member (e.g., the fourth adhesive member 600d of FIG. 10). The first adhesive member may be a material including a material having a low-temperature property and having a Tg of −30 to −20 degrees and a softening point of 90 to 100 degrees. The second adhesive member may be a material including a material having a high-temperature property and having a Tg of −7 to 0 degrees and a softening point of 125 to 135 degrees. The third adhesive member may be a material including a material having a dynamic property and having a push-out of 4.0 to 5.0 kgf and a dupont of 380 to 480 mJ, and the fourth adhesive member may be a material including a material having a static property and having a push-out of 10 to 20 kgf and a dupont of 61 to 71 mJ.

According to various embodiments of the disclosure, an electronic device comprises a housing including a seating groove, an electronic component seated in the seating groove, and a plurality of adhesive members disposed between the electronic component and the seating groove and arranged along at least a portion of an edge of the electronic component including a curved shape. Each of the plurality of adhesive members may be formed of a different material.

According to various embodiments, the adhesive member may be prepared to include a PSA material.

According to various embodiments, the plurality of adhesive members may include a first adhesive member and a second adhesive member. The first adhesive member including the material having the low-temperature property may be a material having a Tg of −30 to −20 degrees and a softening point of 90 to 100 degrees, and the second adhesive member including the high-temperature property may be a material having a Tg of −7 to 0 degrees and a softening point of 125 to 135 degrees.

According to various embodiments, the plurality of adhesive members may include at least one of a third adhesive member or a fourth adhesive member. The third adhesive member including the material having the dynamic property may be a material having a push-out of 4.0 to 5.0 kgf and a dupont of 380 to 480 mJ, and the fourth adhesive member including the static property may be a material having a push-out of 10 to 20 kgf and a dupont of 61 to 71 mJ.

According to various embodiments of the disclosure, an electronic device comprises a housing including a seating groove, an electronic component seated in the seating groove, and a plurality of adhesive members disposed between the electronic component and the seating groove and arranged along at least a portion of an edge of the electronic component including a curved shape. A first portion (e.g., the first portion 630 of FIG. 6A) of each of the plurality of adhesive members may form the same thickness, and a second portion (e.g., the second portion 640 of FIG. 6A) thereof extending from the first portion may have a variable thickness toward an outside.

According to various embodiments, the second portion of each of the adhesive members may include an area whose thickness increases toward the outside, and one surface of the second portion may contact the electronic component, and another surface thereof may contact the seating groove.

It is apparent to one of ordinary skill in the art that the electronic device according to various embodiments of the disclosure as described above are not limited to the above-described embodiments and those shown in the drawings, and various changes, modifications, or alterations may be made thereto without departing from the scope of the disclosure.

The invention claimed is:

1. An electronic device, comprising:
a housing including a seating groove;
a battery seated in the seating groove and including at least a portion in a curved shape; and
an adhesive member disposed between the battery and the seating groove and formed along at least a portion of an edge of the battery,
wherein the adhesive member is formed to have a different designated thickness corresponding to a position of the battery, and
wherein the adhesive member includes a plurality of adhesive members that includes a first adhesive member and a second adhesive member formed of a different material than the first adhesive member.

2. The electronic device of claim 1, wherein at least one among the plurality of adhesive members is prepared to include a liquid material.

3. The electronic device of claim 2, wherein the battery includes a first surface facing in a first direction, a second surface facing in a second direction opposite to the first direction, and a side surface facing in a direction different from the first direction and the second direction and including the curved shape, and
wherein an edge area of the battery, in which the at least one adhesive member is disposed, includes a portion extending from a partial area of the first surface to a partial area of the side surface.

4. The electronic device of claim 3, wherein in the at least one adhesive member, a portion disposed in the partial area of the first surface forms a designated first thickness and a portion disposed in the partial area of the side surface forms a designated second thickness, and
wherein the designated second thickness is greater than the designated first thickness.

5. The electronic device of claim 4, wherein the side surface of the battery includes a first curved surface extending from an end portion of the first surface and a second curved surface extending from an end portion of the second surface, and
wherein the at least one adhesive member disposed on the first curved surface is bent from the end portion of the first surface and extends to an area corresponding to half the thickness of the battery.

6. The electronic device of claim 4, wherein the at least one adhesive member includes a first adhesion surface for bonding with the battery and a second adhesion surface for bonding with the seating groove, and the first adhesion surface forms a curved surface corresponding to the curved shape of the battery, and the second adhesion surface is formed as a horizontal surface having a uniform flatness.

7. The electronic device of claim 4,
wherein the first adhesive member is disposed along a length direction of a side of the battery, and the second adhesive member is disposed along a length direction of another side of the battery.

8. The electronic device of claim 4, wherein each of the plurality of adhesive members is formed of a different material.

9. The electronic device of claim 8,
wherein the first adhesive member is formed of a material having a low-temperature property, including at least one of butyl rubber, poly-isobutylene, isoprene, and butadiene, as a base material, and
wherein the second adhesive member is formed of the different material having a high-temperature property, including a styrene polymer, as a base material.

10. The electronic device of claim 9, wherein the first adhesive member including the material having the low-temperature property is a material having a Tg of −30 to −20 degrees and a softening point of 90 to 100 degrees, and
wherein the second adhesive member including the high-temperature property is the different material having a Tg of −7 to 0 degrees and a softening point of 125 to 135 degrees.

11. The electronic device of claim 8,
wherein the first adhesive member is formed of a material having a dynamic property, including an elastomer (soft), as a base material, and
wherein the second adhesive member is formed of the different material having a static property, including a styrenic copolymer (hard), as a base material.

12. The electronic device of claim 8, wherein an area formed by the first adhesive member disposed on the battery is equal to or larger than an area formed by the second adhesive member disposed on the battery.

13. The electronic device of claim 8, wherein the plurality of adhesive members includes the first adhesive member, the second adhesive member, and a third adhesive member,
- wherein the first adhesive member is a material including a material having a low-temperature property and having a Tg of −30 to −20 degrees and a softening point of 90 to 100 degrees,
- wherein the second adhesive member is the different material including a material having a high-temperature property and having a Tg of −7 to 0 degrees and a softening point of 125 to 135 degrees, and
- wherein the third adhesive member is a material including a material having a dynamic property and having a push-out of 4.0 to 5.0 kgf and a dupont of 380 to 480 mJ.

14. The electronic device of claim 8, wherein the plurality of adhesive members includes the first adhesive member, the second adhesive member, a third adhesive member, and a fourth adhesive member,
- wherein the first adhesive member is a material including a material having a low-temperature property and having a Tg of −30 to −20 degrees and a softening point of 90 to 100 degrees,
- wherein the second adhesive member is the different material including a material having a high-temperature property and having a Tg of −7 to 0 degrees and a softening point of 125 to 135 degrees,
- wherein the third adhesive member is a material including a material having a dynamic property and having a push-out of 4.0 to 5.0 kgf and a dupont of 380 to 480 mJ, and
- wherein the fourth adhesive member is a material including a material having a static property and having a push-out of 10 to 20 kgf and a dupont of 61 to 71 mJ.

15. An electronic device, comprising:
a housing including a seating groove;
an electronic component seated in the seating groove; and
a plurality of adhesive members disposed between the electronic component and the seating groove and arranged along at least a portion of an edge of the electronic component including a curved shape,
wherein a first portion of each of the plurality of adhesive members forms the same thickness, and a second portion thereof extending from the first portion has a variable thickness toward an outside, and
wherein the plurality of adhesive members that includes a first adhesive member and a second adhesive member formed of a different material than the first adhesive member.

* * * * *